(12) United States Patent
Hussain et al.

(10) Patent No.: US 8,205,099 B2
(45) Date of Patent: Jun. 19, 2012

(54) POWER OVER ETHERNET CONNECTOR WITH INTEGRATED POWER SOURCE EQUIPMENT (PSE) CONTROLLER

(75) Inventors: Asif Hussain, Tustin, CA (US); Manisha Pandya, Anaheim Hills, CA (US); Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 1437 days.

(21) Appl. No.: 11/783,401

(22) Filed: Apr. 9, 2007

(65) Prior Publication Data

US 2007/0237322 A1    Oct. 11, 2007

Related U.S. Application Data

(60) Provisional application No. 60/789,919, filed on Apr. 7, 2006.

(51) Int. Cl.
    *G06F 1/26* (2006.01)
(52) U.S. Cl. ........................................ 713/300; 713/340
(58) Field of Classification Search .................. 713/300, 713/340
    See application file for complete search history.

(56) References Cited

U.S. PATENT DOCUMENTS

| | | | |
|---|---|---|---|
| 7,469,348 B2 | 12/2008 | Camagna et al. | |
| 7,504,744 B2 | 3/2009 | Stanford | |
| 7,685,452 B2 | 3/2010 | Ghoshal et al. | |
| 7,706,392 B2 | 4/2010 | Ghoshal et al. | |
| 7,711,967 B2 | 5/2010 | Woo et al. | |
| 7,761,719 B2 * | 7/2010 | Ghoshal et al. | 713/300 |
| 7,797,558 B2 | 9/2010 | Ghoshal et al. | |
| 8,037,324 B2 | 10/2011 | Hussain | |
| 2006/0112285 A1 * | 5/2006 | Stineman | 713/300 |
| 2007/0133238 A1 * | 6/2007 | Herbold | 363/63 |
| 2008/0080105 A1 * | 4/2008 | Blaha et al. | 361/38 |

* cited by examiner

*Primary Examiner* — Thuan Du
(74) *Attorney, Agent, or Firm* — Sterne, Kessler, Goldstein & Fox P.L.L.C.

(57) ABSTRACT

In a Power over Ethernet (POE) system, a power source equipment (PSE) device configured to deliver power to one or more powered devices (PDs) over a plurality of Ethernet transmission lines. The PSE interface includes a multi-port transmission line connector capable connecting to multiple Ethernet transmission lines, and a power source equipment (PSE) controller module integrated with the multi-port transmission line connector. The PSE controller module is capable of semi-automatic mode and legacy detection of one or more of the PDs that are coupled to the Ethernet transmission lines. The PSE controller module includes a plurality of PSE controllers corresponding to the Ethernet transmission lines, including a master PSE controller and plurality of slave PSE controllers coupled to the master PSE controller. The master PSE controller controls the slave PSE controllers, so as to provide power management to said corresponding PD devices, without an external microcontroller. In another embodiment, the PSE controller(s) inside the connector are configured for fully automatic mode, and include the feature of independent power management.

22 Claims, 11 Drawing Sheets

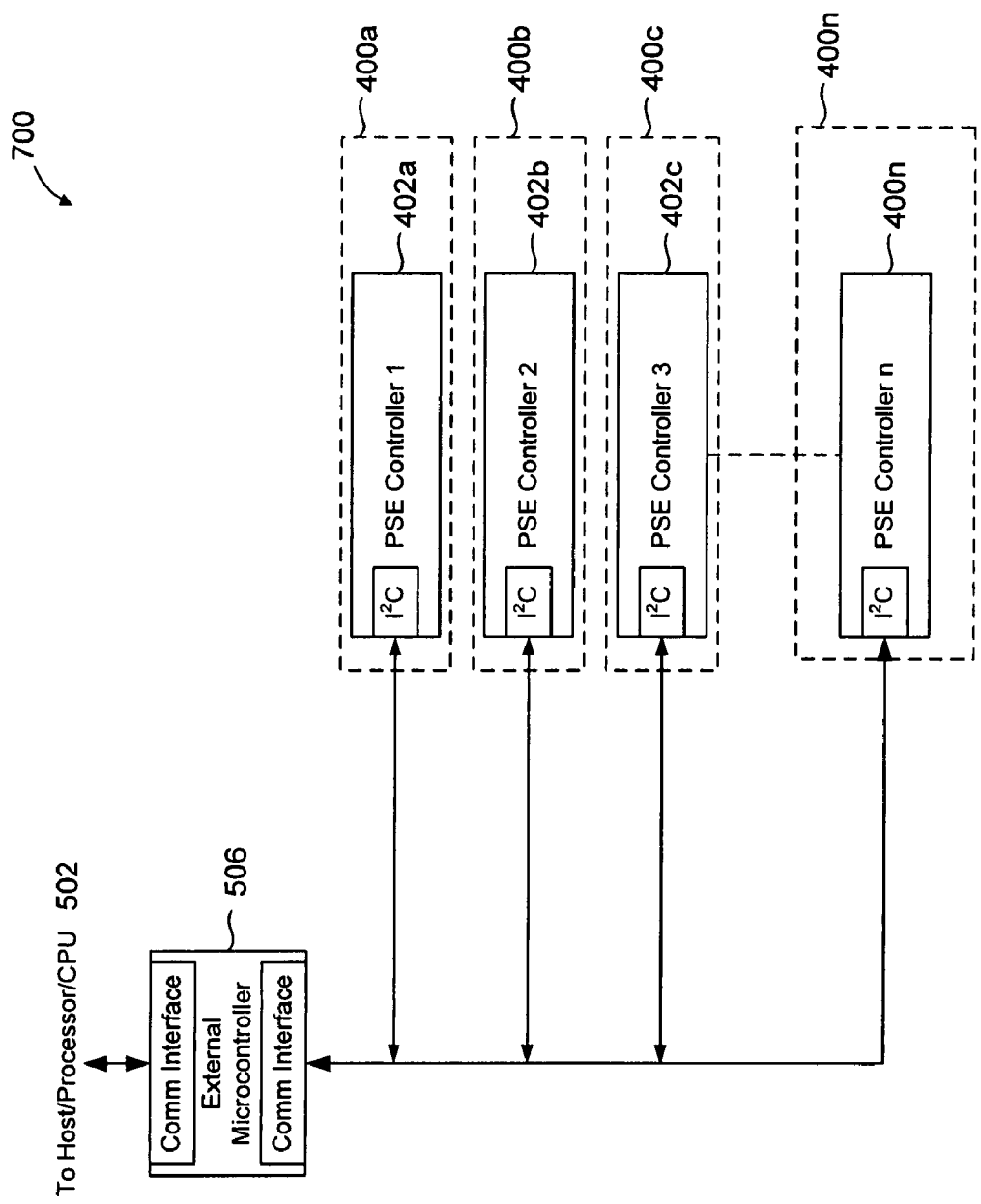

POWER OVER ETHERNET CONNECTOR WITH INTEGRATED POWER SOURCE EQUIPMENT (PSE) CONTROLLER

CROSS REFERENCED TO RELATED APPLICATIONS

This application claims the benefit of U.S. Provisional Application No. 60/789,919, filed on Apr. 7, 2006, which is incorporated by reference herein in its entirety.

BACKGROUND OF THE INVENTION

1. Field of the Invention

The present invention generally relates to Power Over Ethernet, and specifically to Power Source Equipment connectors with integrated controllers operating in a semi-automatic, and fully automatic mode.

2. Background Art

Ethernet communications provide high speed communications between data terminals. For example, a switch may be one data terminal and an IP Phone may be another data terminal. Power over Ethernet configurations provide power over the same transmission lines (e.g. twisted pair, cable, etc) that carry the data. The power is generated at the Power Source Equipment (PSE) side of the transmission line and is carried over the data transmission lines to a Powered Device (PD). For example, a switch (PSE) may connect power to an IP phone (PD) that has been activated.

A PSE controller is typically used for power management of the connected Powered Device. For example, a PSE controller typically detects whether a valid PD device is active, and manages and classifies the power flow to the PD.

The PSE controller is typically separate from both the magnetics and from the connector. For example, often a RJ45 connector can be used to connect the PSE to the data transmission lines. The connector can often include the magnetics required to separate the data from power on the PSE side.

What is needed is a PSE connector configuration that leverages integration in the PSE connector, including a semi-automatic and stand alone solutions.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 7 illustrates a POE system architecture inside integrated magnetic RJ45 connectors and integrated PSE controllers in semi-automatic mode.

DETAILED DESCRIPTION OF THE INVENTION

Figure 1:
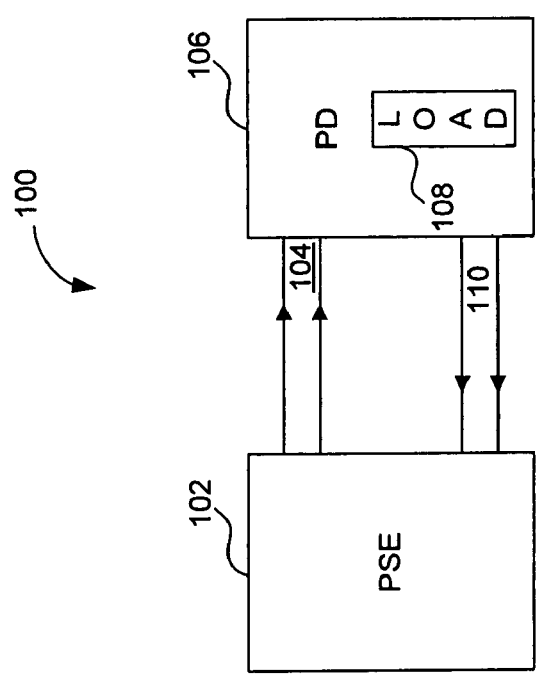
FIG. 1 provides an overview of a Power over Ethernet system.

FIG. 1 illustrates a high level diagram of a conventional Power over Ethernet (PoE) system 100 that provides DC power over a common data communications medium. Referring to FIG. 1, power source equipment 102 provides DC power over conductors 104, 110 to a powered device (PD) 106 having a representative electrical load 108. Accordingly, the power transfer between the PSE 102 and the PD 106 occurs simultaneously with the exchange of high speed data over the conductors 104, 110. In one example, the PSE 102 when used with a switching and PHY chip is a data switch having multiple ports that is communicating with one or more PD devices, such as Internet phones, wireless access points, etc.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 1 Gigabit Ethernet. In 10/100 Ethernet, only two of the four pairs carry data communications, and the other two pairs of conductors are unused. Herein, conductor pairs may be referred to as Ethernet cables or communication links or structured cabling for ease of discussion. The conductor pairs may be CAT-5 cable for example.

Figure 2:
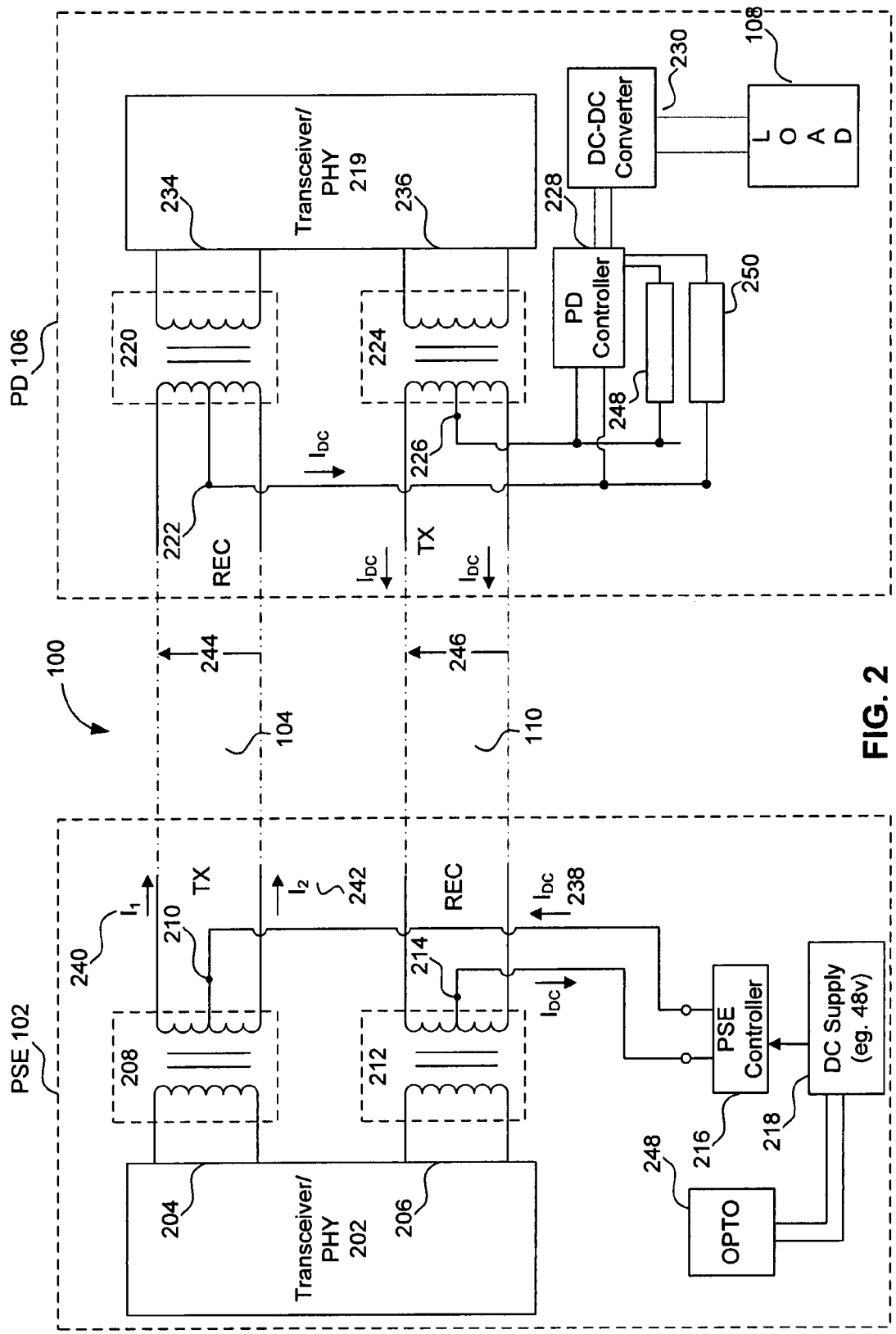
FIG. 2 provides a more detailed view of a Power over Ethernet system including DC power transfer from a PSE device to a PD device.

FIG. 2 provides a more detailed circuit diagram of the PoE system 100, where PSE 102 provides DC power to PD 106 over conductor pairs 104 and 110. PSE 102 includes a transceiver physical layer device (or PHY) 202 having full duplex transmit and receive capability through differential transmit port 204 and differential receive port 206. (Herein, transceivers may be referred to as PHYs.) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the transceiver 202, but isolate any low frequency or DC voltage from the transceiver ports, which may be sensitive large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC output voltage is applied across the respective center taps (e.g. 210, 214) of the transformers 208 and 210 on the conductor side of the transformers. An example DC output voltage for the DC supply 216 is 48 volts, but other voltages could be used depending on the voltage/power requirements of the PD 106.

The PSE 102 further includes a PSE controller 218 which performs the power management functions based on the dynamic needs of the PD 106. More specifically, the PSE controller 218 measures the voltage, current, and temperature, etc so as to characterize the power requirements of the PD 106.

Further, the PSE controller 218 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. The IEEE has imposed standards on the detection, power classification, and monitoring of a PD by a PSE in the IEEE 802.3af™ standard, which is incorporated herein by reference.

Still referring to FIG. 2, the contents and functionality of the PD 106 will now be discussed. The PD 106 side includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 106 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (e.g. 3 volts, 5 volts, 12 volts) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 218 will recognize the PD as a valid PoE device, and be able to classify its power requirements. FIG. 2 also illustrates a signature resistor 248 and a classification resistor 250 connected to PD 102. Signature resistor 248 is used to validate the PD 106, and the classification resistor 250 is used for classifying PD 106 and to limit current for classification.

During ideal operation, a direct current (IDC) 238 flows from the PSE Controller 216 through the first center tap 210, and divides into a first current (I1) 240 and a second current (I2) 242 that is carried over conductor pair 104. The first current (I1) 240 and the second current (I2) 242 then recombine at the third center tap 222 to reform the direct current (IDC) 238 so as to power PD 106. On return, the direct current (IDC) 238 flows from PD 106 through the fourth center tap 226, and divides for transport over conductor pair 110. The return DC current recombines at the second center tap 214, and returns to the DC power supply 216.

As discussed above, data transmission between the PSE 102 and the PD 106 occurs simultaneously with the power as described above. Accordingly, a first communication signal 244 and/or a second communication signal 246 are simultaneously differentially carried via the conductor pairs 104 and 110 between the transceivers or PHY of PSE 102 and the PD 106. It is important to note that the communication signals 244 and 246 are differential signals that ideally are not effected by the DC power transfer described above. However, the signaling used by the PSE controller is common mode signals so it does not interact with data transmission.

In order to conduct its management and control of PD 106, PSE 102 analyzes certain characteristics of PD 106, and the system as a whole, based on measurements taken at PD 106. Based on those characteristics, PSE 102 can determine certain attributes of PD 106 as well as attributes of the system. Example attributes determined by PSE 102 can include, but are not limited to, the following: valid device detection, power classification, AC disconnect information, short circuit detection, PD load variations, various current measurements, overload conditions, and inrush conditions.

Figure 3:
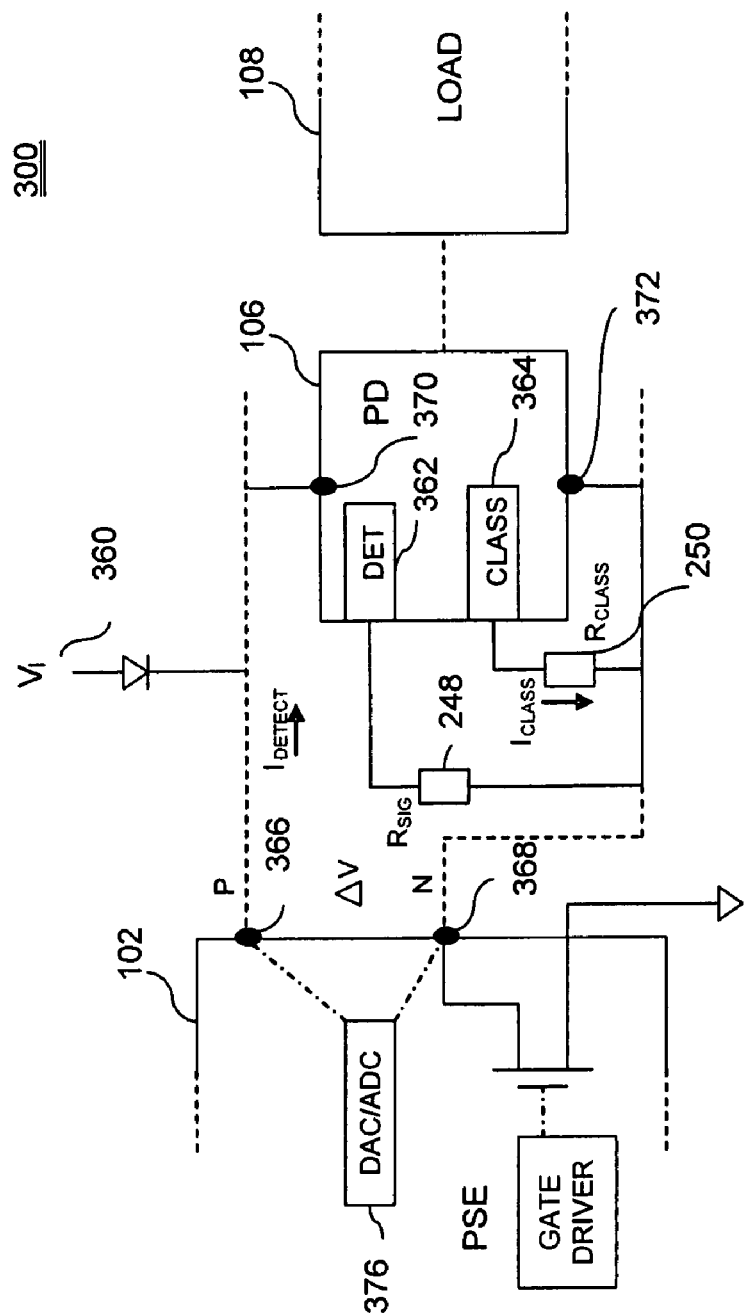
FIG. 3 illustrates detection and classification in a PD device.

FIG. 3 illustrates detection and classification the of the PD 106. As shown in FIG. 3, positive terminal 366 of PSE 102 is connected to a first terminal 370 of PD 106, and negative terminal 368 of PSE 102 is connected to a second terminal 372 of PD 106. (For the sake of simplicity, bridge rectifiers and series diodes are not considered.) A voltage source 360 is connected to the positive terminal 366 of PSE 102 to provide input voltage $V_I$. According to the current IEEE 802.3af™ standard, the operating voltage should range from 44V to 57V.

Still referring to FIG. 3, PD 106 includes detection circuitry 362 and classification circuitry 364. The signature resistance 248 is located between detection circuitry 362 and the negative terminal 368 of PSE 102. Signature resistance 248 is used to determine the validity of PD 106, as will be described in more detail below. The classification resistor 250 is located between classification circuitry 364 and the negative terminal 368 of PSE 104. Current ($I_{CLASS}$) across the classification resistor 352 determines the power classification signature for PD 106, as will also be discussed in more detail below.

Before power is supplied to PD 106, PSE 102 first determines whether PD 106 is a valid device. This is called 'detection.' For detection, PSE 102 may probe PD 106 with the current ($I_{DETECT}$). In addition, PSE 102 may probe for the voltage drop ($\Delta V$) between positive terminal 366 and negative terminal 368. This can be done using an internal analog-to-digital converter 376, for example. Alternatively, a bandgap voltage (e.g., in the range 2.7V to 10.1V) (not shown) can be applied at PD 106. The resistive signature $R_{SIG}$ 248 is then calculated according to $R_{SIG} = \Delta V / I_{DETECT}$. If $R_{SIG}$ is calculated to be an expected value (e.g., approximately 25 K ohms, or within a specified resistance value range), then PD 106 is determined to have a valid signature and is deemed a compatible valid device. If PD 106 is deemed a non-compatible device, then power will not be supplied to PD 106. IEEE 802.3af™ requires minimum of two points detection to ensure the validity of the device.

After detection of a valid PD, power classification occurs. Power classification is used to determine the range of minimum power needed at the output of PSE 102 and, in turn, the range of maximum power to be used by PD 106, according to IEEE 802.3af™. For power classification, PSE 102 applies a voltage at PD 106. For voltage applied to PD 106 ranging from 14.5V to 20.5V, IEEE 802.3af™ currently defines four classifications (classes 0-3) of power ranges, with a fifth classification (class 4) reserved for future use (but currently treated as class 0). In order to classify the PD to the appropriate power range, the current is measured through classification resistor 250.

An integrated PoE Magnetic RJ45 connector will now be described that integrates magnetics and a POE PSE controller into a single connector. The connector can be an RJ45 connector, which is easily connectable to standard Ethernet cables. Alternatively, other types of connectors can be used. Conventional integrated POE/PSE connector solutions only offer either manual mode, or fully automatic mode, which are described further below. No one offers a semi-automatic mode inside an integrated POE Magnetic RJ45 solution, the advantages of which will be discuss below.

Figure 4A:
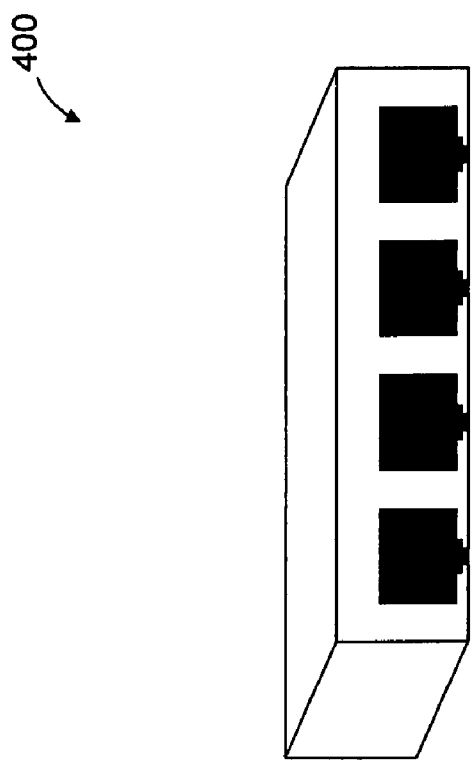
FIGS. 4A-4B illustrates a RJ 45 connector having an integrated PSE controller for POE power management.

FIG. 4A illustrates an integrated PSE connector 400 that is an integrated POE magnetic RJ45 Solution having a RJ45 gang connector (2×4, 2×6, 2×8, etc.) with integrated magnetics and integrated PSE Controller(s). In other words, the PSE controller(s) are integrated within the RJ45 connector portion of the PSE connector 400.

Figure 4B:
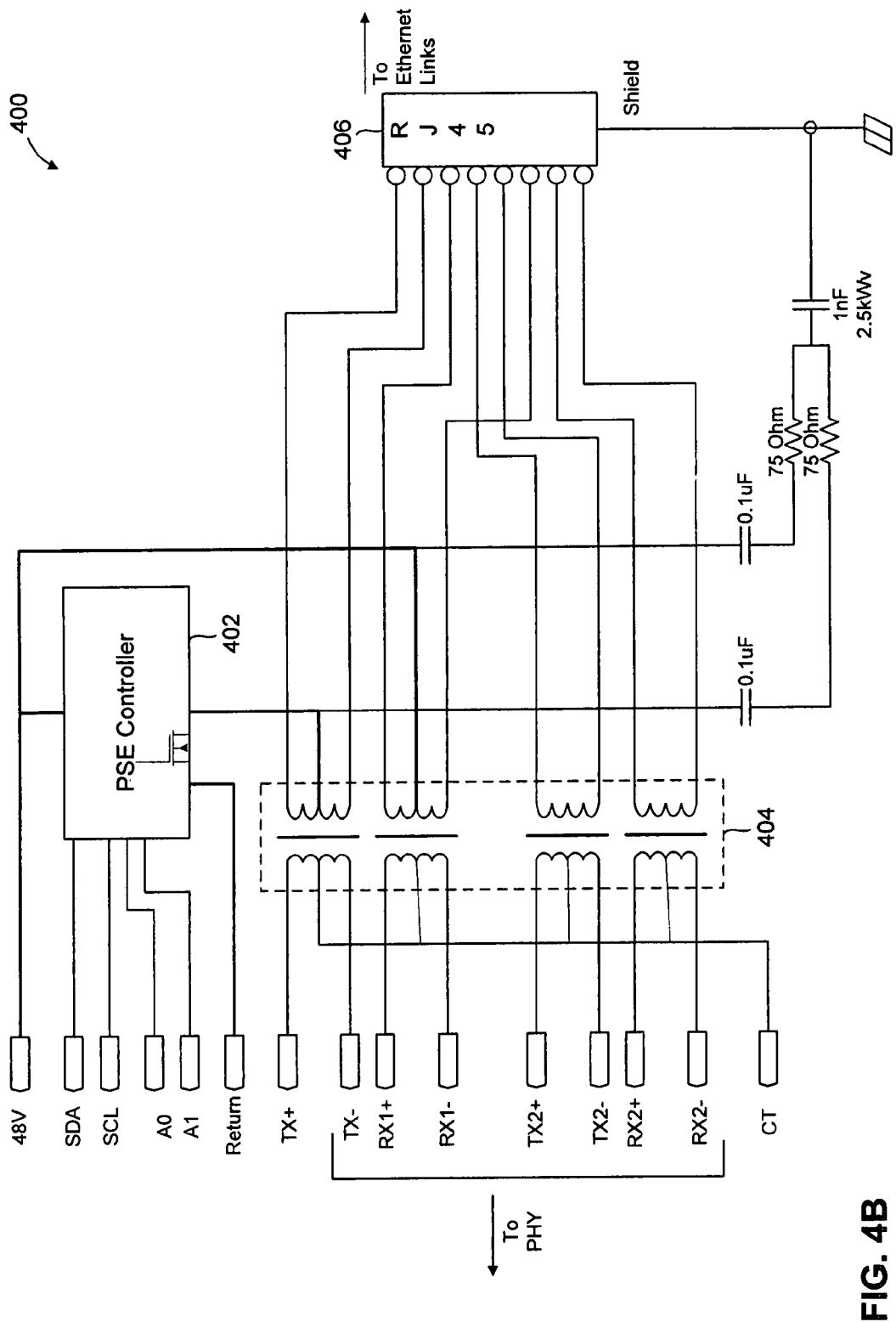

FIG. 4B illustrates the schematic of the integrated PoE magnetic RJ45 connector with the integrated PSE controller. Referring to FIGS. 4A and 4B, the integrated PSE connector 400 couples PHY transceivers with the Ethernet transmission lines. Specifically, the integrated PSE Controller 400 connects the PHY transceivers (e.g. transceiver 202) to the corresponding Ethernet cables, through integrated magnetics 404 and a connector 406, for example an RJ 45 connector 406. Further, PSE connector 400 includes integrated PSE Controller(s) 402 to control the power distribution and management to the PD(s).

Figure 5:
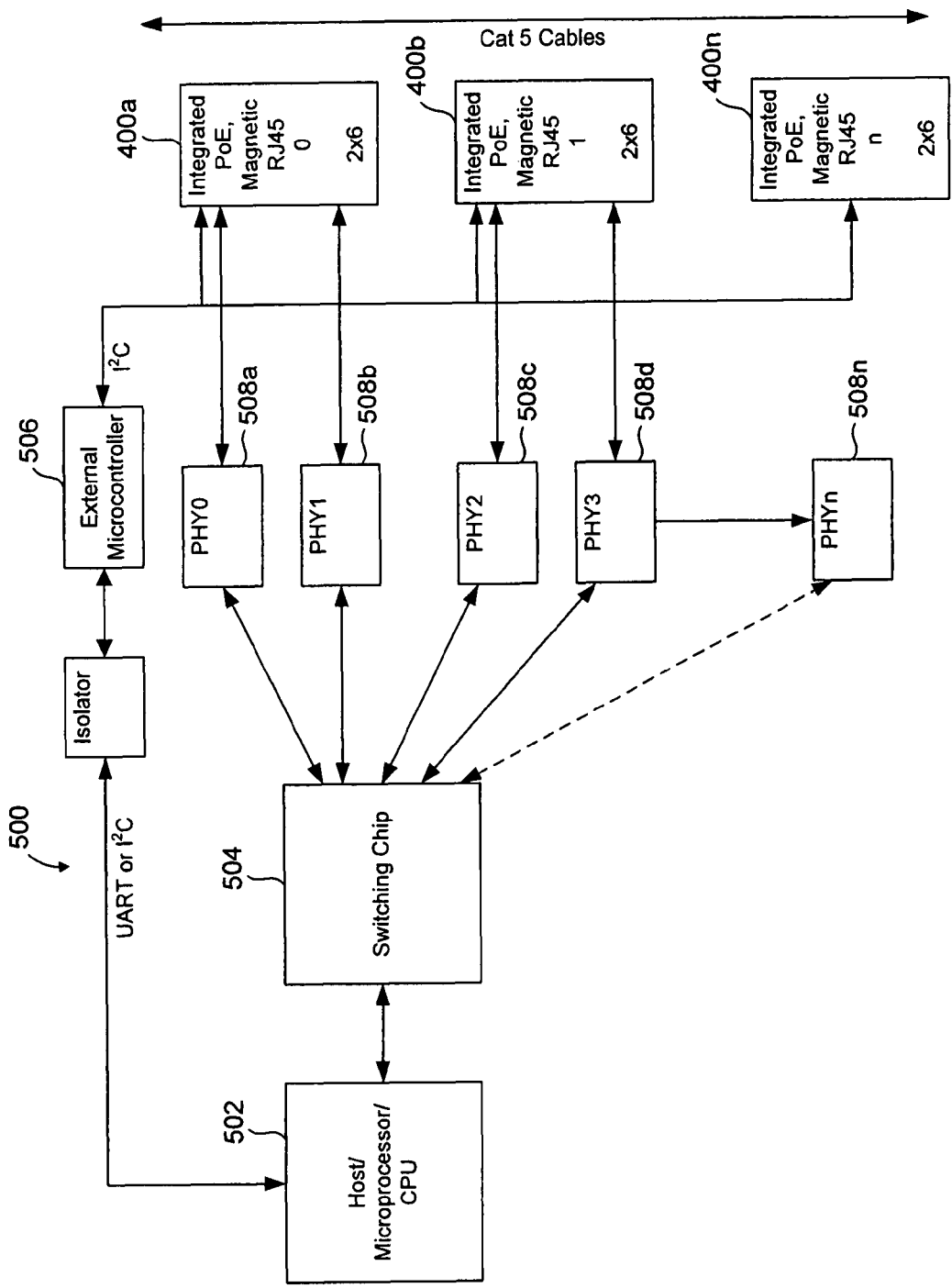
FIG. 5 illustrates a typical POE system using conventional integrated Magnetic RJ45 connectors with an external microcontroller for power management.

FIG. 5 illustrates a typical PSE device 500 using conventional integrated magnetic PSE connectors 400 with an external micro-controller. The system includes a Host controller/CPU 502, switching chip 504, external microcontroller 506, PHYs 508a-n that are connected to corresponding PSE connectors 400a-n. Each of the PSE connector 400a-n have integrated PSE controllers 402. The external micro-controller 506 is used to implement the semi-Auto mode. However, this external micro-controller 506 is not required for manual or Auto mode. The external micro-controller 506 communicates and controls each of the PSE controller 402a-n, directly. This requires increased connections and external resources that are undesirable. Further, the external microcontroller 506 takes up board space and may not be a feasible solution in complicated PCB layouts. This conventional configuration does not support semi-automatic mode, where the individual integrated PSEs control the power management. In other words, the integrated PSEs are under the control of the external microcontroller.

Figure 6:
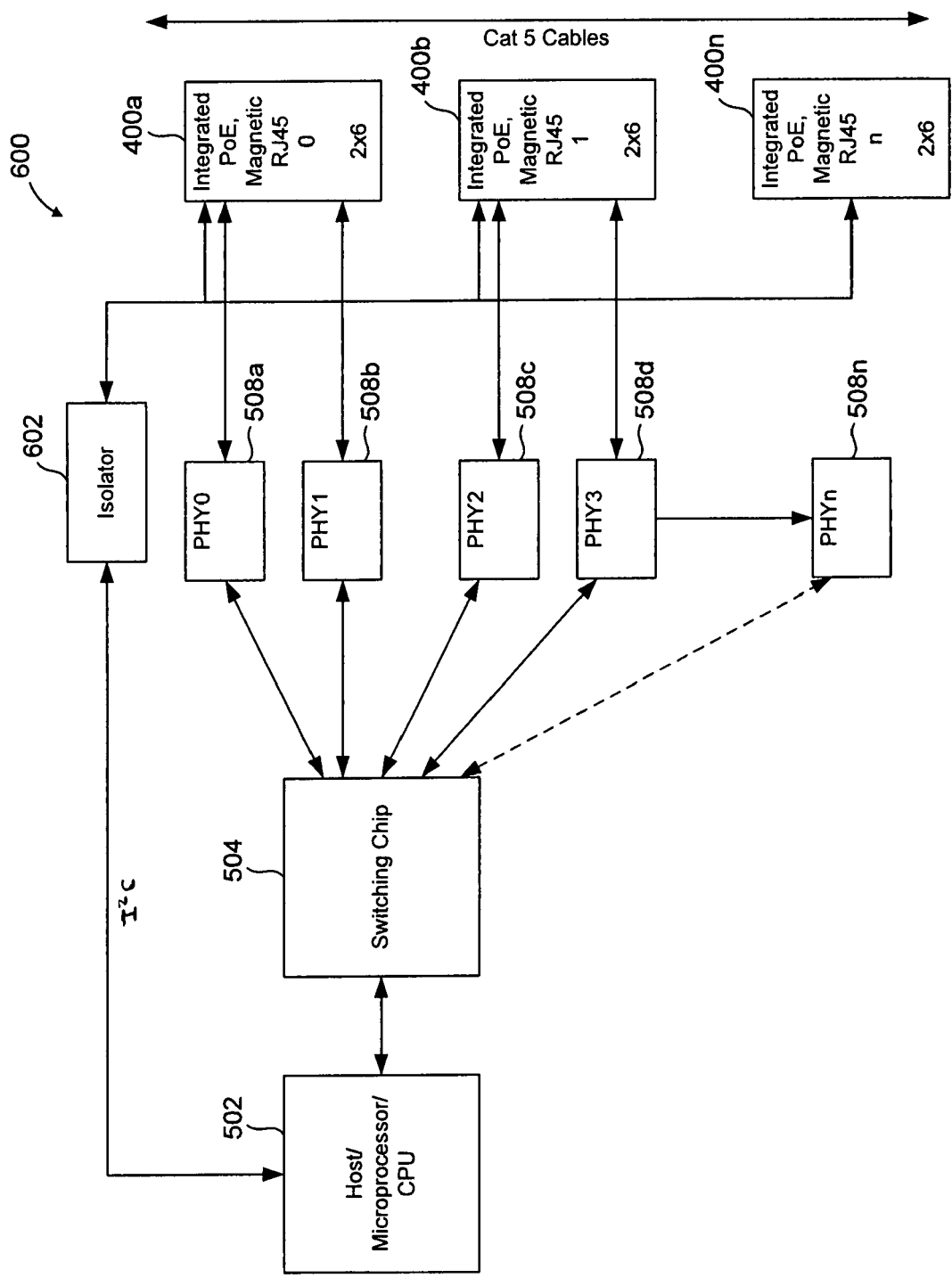
FIG. 6 illustrates a typical POE system using conventional integrated magnetic RJ45 connectors without an external micro-controller using the CPU for power management.

FIG. 6 illustrates a typical POE system 600 using conventional integrated PSE connectors 400 without an external micro-controller. Instead, the CPU 502 directly controls the integrated PSE connector 402 through an opto isolator 602. However, using the CPU 502 for this purpose will require significant processing power from the CPU 502 to implement the power management that could be used elsewhere, and therefore is undesired. In other words, it is preferable not to burden the CPU 502 with this POE management functions.

FIG. 7 illustrates a POE system 700 with integrated PSE connectors 400 having integrated PSE controllers 402a-n that are controlled by a external microcontroller 702 in semi-automatic mode. In the semi-automatic mode, all of the PSE controller chips 402a-n are coupled to the external microcontroller 506. The purpose of this configuration is to take the load off the host controller 502 using the external microcontroller 506 to do the power management functions. The host processor 502 is then only used to pole the status from the external microcontroller 506, and keep track of the status for reporting purposes. In other words, the host processor/cpu 502 may be used to report the status the power management of the Ethernet devices. The POE system 700 is essentially the POE system 500 with the PHYs not shown to simply the illustration of the control functions. As discussed above, the microcontroller 506 communicates directly with the PSE controller chip 402 in each integrated connector 400. The communication can be via I$^2$C interface, or another type of interface. Further, the communication to the Host Processor/CPU 502 can be via I$^2$C interface, or another type of interface.

Figure 8A:
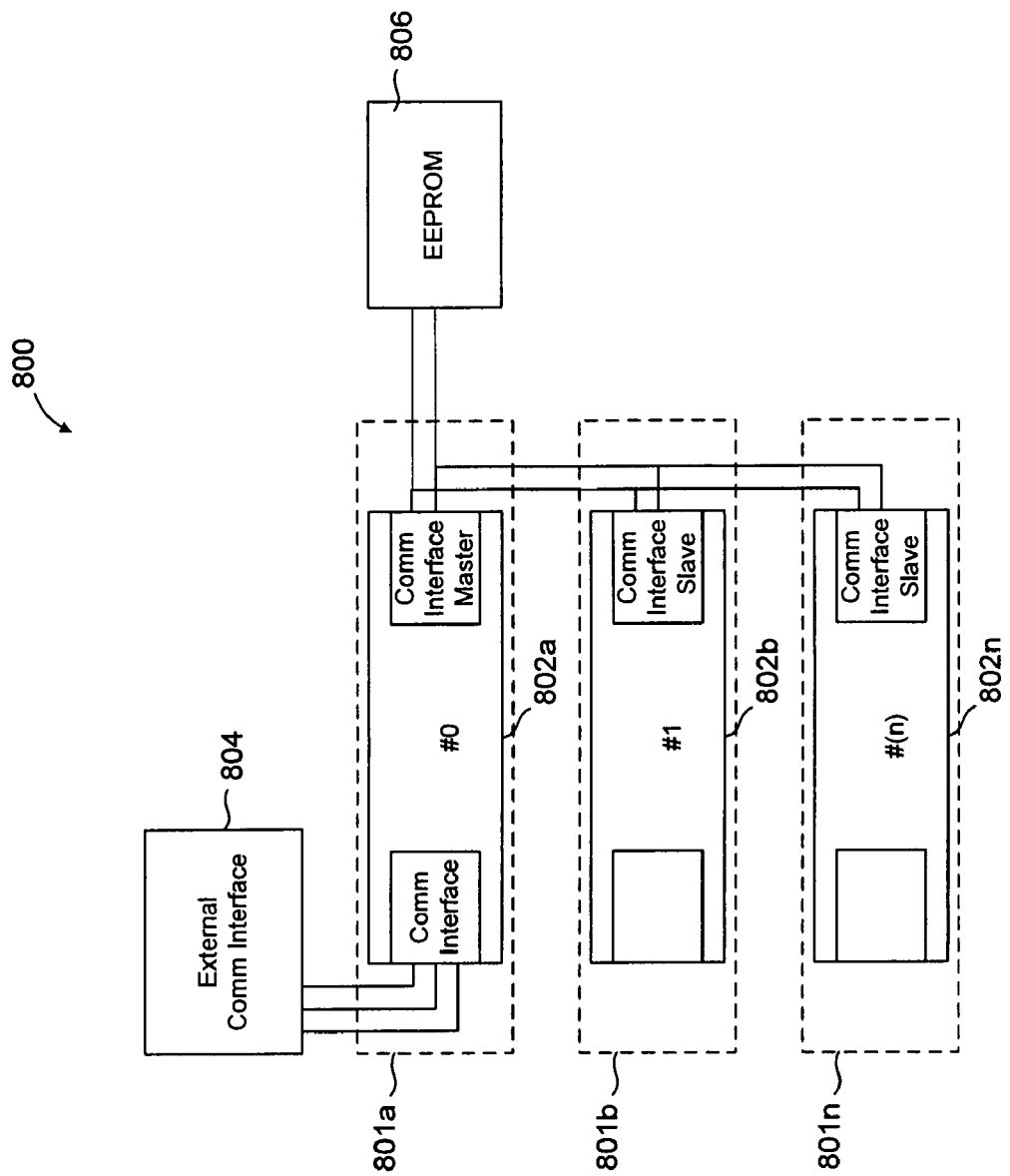
FIGS. 8A-8B illustrate a semi-automatic mode solution according to embodiments of the present invention, having an internal master controller.

FIG. 8A illustrates a semi-automatic mode solution 800 according to embodiments of the present invention, having an external communications interface 804, and PSE connectors 801a-n with integrated PSE controllers 802a-n. Each PSE connector 801 also includes also integrated RJ45 connectors with integrated magnetics, similar to the PSE connector 400, in addition to the PSE controllers 802a-n. As with FIG. 7, the PHYs, magnetics, and actual physical connectors are not shown for ease of discussion. In other words, the integrated magnetics can be similar to magnetics 208, 212, 220, and 224.

The PSE controller 802a operates as a master controller that controls the slave controllers 802b-n, and collectively can be referred to as a PSE controller module for convenience. During operation, the PSE controllers 802a-n determine the validity of the corresponding PD connection, and classify the power requirements of the PD once validity has been established. The PSEs 802 then control and monitor the power distribution to the PD. In other words, once a PSE controller 802 determines that a valid PD has been connected, then the PSE 802 controls the power distribution and disconnects the power when the PD disconnects. The external interface 804 only provides a status of the PSE 802a-n power control. For example, the status can include that the link to the PD is up and running and that power is being transferred to the PD. The status can be provided to a host processor/CPU 502 for further reporting, etc. The communications can be via multiple types of communications standards including I$^2$C, serial, etc, and other interfaces known to those skilled in the arts.

As shown, the master controller 802 and the slave controllers are 802b-n are connected together so that the master communicates with the slave controllers via the most adjacent slave controller. Other configurations could be used including parallel control and communications.

Figure 8B:
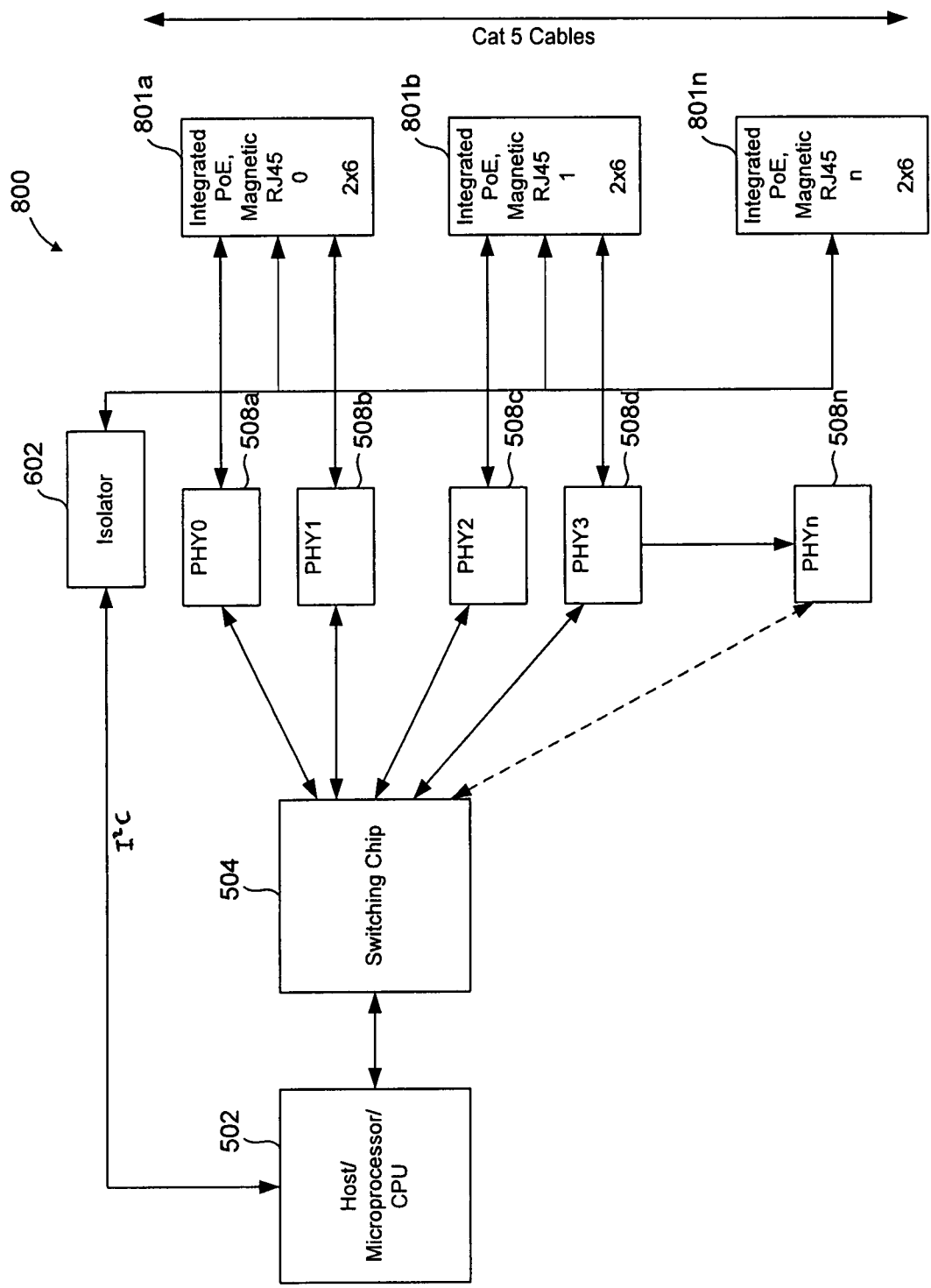

FIG. 8B illustrates the semi-automatic solution 800 with the PHYs 508a-n and integrated connectors 801a-n, along with the opto isolator 602, switching chip 504, and host processor/CPU 502 for completeness. As discussed above, the integrated PSE connectors 801a-n have corresponding integrated PSE controllers 802a-n that operate in a Master/Slave configuration that does not require and external controller. As illustrated in FIG. 8B, the integrated PSE connector 801a with master PSE controller 802a controls the slave controllers 802b-n for power management of the corresponding PDs. The master PSE 802a then reports status to the host processor/CPU 502, thus freeing the host processor/cpu 502 from power management duties.

In embodiments, the PSE Controllers 802 are Broadcom PSE controllers BCM 59101. However the invention is not limited to these PSE Controllers, as other PSE Controllers as will be understood by those skilled in the arts.

In summary, the conventional configurations described above, require the use of an external microcontroller to implement semi-auto mode. Whereas, the invention described herein does not require an external controller for control operations, and only uses an external device for reporting status. Semi-auto mode brings new features within integrated PoE magnetic RJ45 connector such as legacy detection, power management, etc.

In embodiments, the integrated PSE connectors 802 have magnetic jack connectors (RJ-45 or RJ-24) that are configured for 10/100/1000Base-T Ethernet with integrated magnetics that includes PoE functionality and semi-auto mode support, as described above.

In legacy devices (i.e. prior to IEEE 802.3af™ standard was ratified), PD detection is performed using capacitor detection in most of the cases. Specifically, a valid PD included a known capacitor in legacy devices. During detection mode, the PSE sends a known current to the PD device, and the time constant is measured to determine if the proper capacitance was measured. In contrast, non-legacy devices utilize a resistor for this purpose. Specifically, as shown in FIG. 3, signature resistor 248 in the PD provides the detection resistance that is sought during detection mode. Accordingly, legacy devices utilized a capacitor in place of the resistor 248 for PD validation.

Before IEEE802.3af™ standard was ratified, many vendors utilized proprietary methods of detecting a Powered Device (PD) such as IP Phones, Wireless Access Points, etc. Detecting a PD before power can be applied is important due to safety reasons so as to make sure you apply power to a valid device. Many vendors, used a capacitor as a signature on PD side which could be detected to determine if it's a valid device or not. So, it is an important feature for PSE interface to be able to detect legacy devices.

IEEE 802.3af™ defines a resistor signature to be used for detection.

Current integrated PoE magnetic RJ45 solutions do not support legacy detection. However, the present integrated PoE Magnetic RJ45 solution 800 using the integrated PSE controllers 802 does support legacy detection. Specifically, the integrated PSE controllers 802 include the ability to detect legacy capacitors during PD detection, in addition to resistors. Further, an external microcontroller is not necessary for this legacy detection feature.

In embodiments, the PSE controller 404 is a Broadcom BCM 59101 PSE Controller. However, the invention is not limited to this controller. In fact, any PSE controller can be used that has semi-auto power control mode and legacy detection.

Current integrated PoE magnetic RJ45 solutions do not support power management. However, with the support of semi-auto mode, this invention is makes it possible to implement power management with the each integrated PoE magnetic RJ45 solution. In FIG. 8A, a Host CPU may allocate power budget to each integrated PoE magnetic RJ45 module. The master PSE controller in each integrated PoE magnetic RJ45 module will use this power budget to implement power management function.

Figure 9:
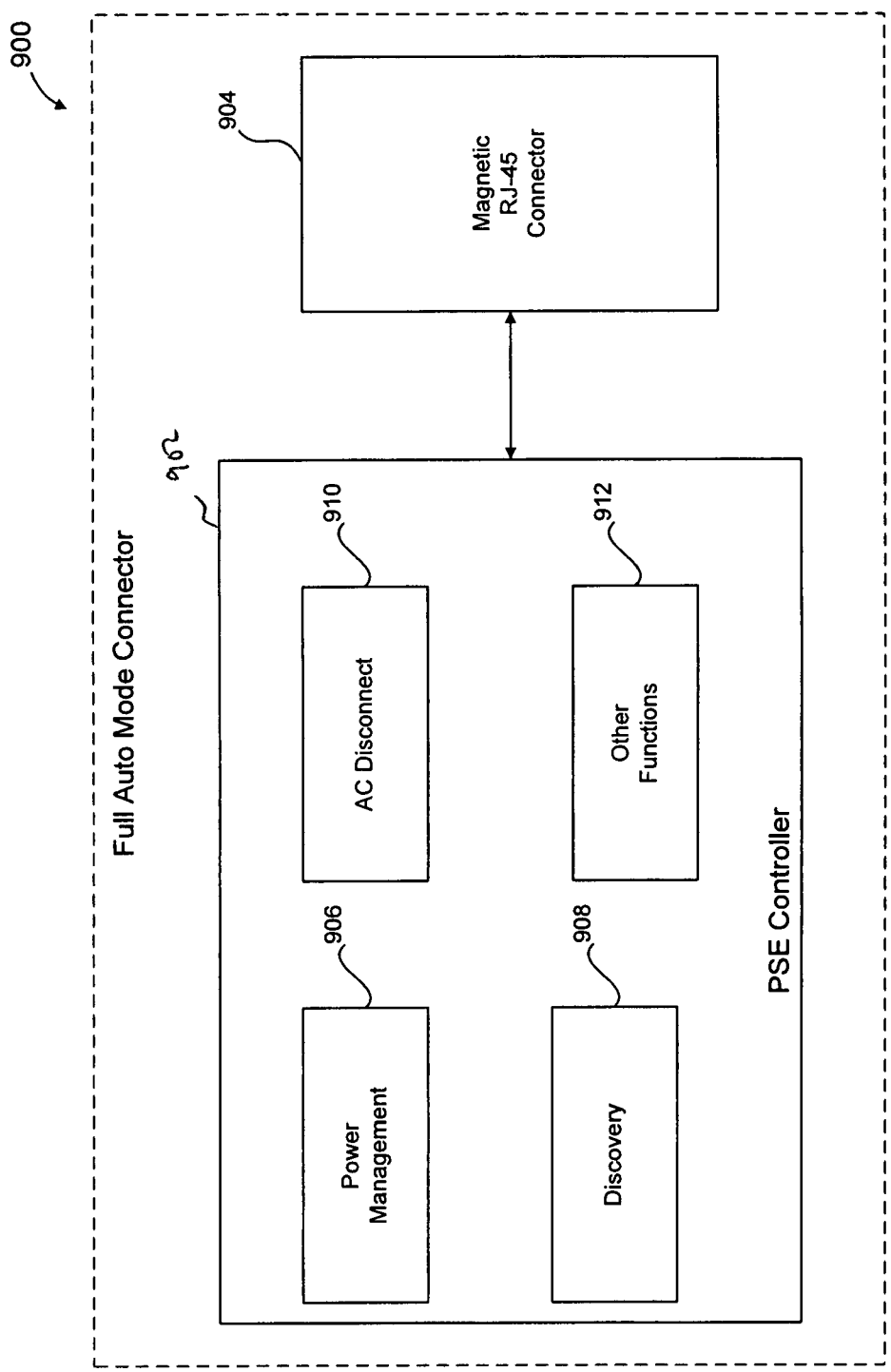
FIG. 9 illustrates a fully-automatic mode or stand-alone solution, according to embodiments of the present invention.

FIG. 9 further illustrates a fully-automatic PSE connector 900 according to embodiments of the present invention. The PSE connector 900 includes a PSE controller 902 and a magnetic RJ-45 connector 904. The invention is not limited to an RJ-45 connector, other types of connectors could be used. The PSE controller 902 includes POE power management 906, discovery/detection mode 908, AC disconnect 910, and other POE functions 912. The PSE controller 902 is capable of operating in fully independent mode and does not require an external communications interface for status reporting, etc. Accordingly, the PSE connector 900 is substantially self-contained, and does not require external communications to conduct POE power management of a corresponding PD device.

The invention(s) described herein can be used with all forms of Ethernet communications, including: 10, 100, 1000BASE-T, in addition to 10GBASE-T Ethernet, and other forms of Ethernet and non-Ethernet data communications. It is noted that 10 and 100Base-T uses two pair of the 4 pairs of Ethernet lines for data communications, so that the other two pair can be used for power transfer. Whereas, 1 Gigabit and 10 Gigabit Ethernet uses all four transmission lines for data transmission. The invention is not limited to these standards, and could use other standards.

Further, the invention has been discussed above in relation to IEEE 802.3af™ standard. However the invention is not limited to this standard and can operate within other POE standards and configurations including: IEEE 802.3af™, IEEE 802.3at™, legacy POE transmission, and other types of POE transmission.

Conclusion

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A power source equipment (PSE) connector, comprising:
  a multi-port transmission line connector configured to connect to multiple Ethernet transmission lines; and
  a power source equipment (PSE) controller module integrated with said multi-port transmission line connector, said PSE controller module configured for power management and legacy detection of one or more powered devices coupled to said Ethernet transmission lines;
  said PSE controller module including a plurality of PSE controllers corresponding to said Ethernet transmission lines, including a master PSE controller and plurality of slave PSE controllers coupled to said master PSE controller.

2. The PSE connector of claim 1, wherein said master PSE controller communicates with said slave PSE controllers via a control communication link.

3. The PSE connector of claim 2, wherein said data link is an $I^2C$ communication link.

4. The PSE connector of claim 2, wherein said communication link is a link between said master PSE controller and said slave PSE controllers.

5. The PSE connector of claim 1, wherein said slave PSE controllers manage DC power flow to corresponding PDs coupled to said Ethernet links, based on communications with said master PSE.

6. The PSE connector of claim 5, wherein said master PSE controller controls said slave PSE controllers, so as to provide power management to said corresponding PD devices, without an external microcontroller.

7. The PSE connector of claim 6, wherein said power management of said PD devices includes at least one of PD detection and PD classification.

8. The PSE connector of claim 6, wherein said power management includes managing DC power flow to PD devices that are determined to be valid.

9. The PSE connector of claim 6, wherein said master PSE controller provides a report to a host processor coupled to said master PSE controller, said report based on said PD power management.

10. The PSE connector of claim 9, wherein said master PSE controller includes a communication link to said host processor, said communication link including a I2C communication link.

11. The PSE connector claim 1, wherein said master PSE controller and said slave PSE controllers are configured to detect a target capacitance of said corresponding PD devices in support of legacy detection of said PD devices during a detection mode.

12. The PSE connector of claim 1, wherein said master PSE controller and said slave PSE controllers are configured to detect a target resistance of said corresponding PD devices in support of non-legacy detection of said PD devices during a detection mode.

13. The PSE connector of claim 12, wherein said target resistance is approximately 25K ohms.

14. The PSE connector of claim 1, wherein said PSE controller module is further configured for one of discovery mode, and AC disconnect functionality.

15. The PSE connector of claim 1, wherein the Ethernet transmission lines are capable of being connected to a multi-port powered device.

16. The PSE connector of claim 1, wherein said PSE controller module is further configured to operate in a semi-automatic mode.

17. The PSE connector of claim 1 wherein the multi-port transmission line connector is further configured as a RJ-45 connector.

18. In a Power over Ethernet (POE) system, a power sourcing equipment (PSE) configured to probe other powered devices (PDs) over a plurality of Ethernet transmission lines, comprising:
a multi-port transmission line connector configured to connect to the multiple Ethernet transmission lines, said multi-port transmission line connector having an integrated transformer for each port of said multi-port transmission line connector;
a power supply configured to provide DC power to said PSE controller to one or more PDs via said integrated transforms of said multi-port transmission line connector; and
a plurality of physical layer devices (PHYs) coupled to said multi-port transmission line connector, and configured to transmit and receive data over said multiple Ethernet transmission lines through said multi-port transmission line connector, said PHYs insulated from said power supply by said integrated transformers;
wherein said multi-port transmission line connector includes a plurality of PSE controllers integrated with said multi-port transmission line connector, said plurality of Ethernet controllers having a master PSE controller and plurality of slave PSE controllers coupled to said master PSE controller; and
wherein each PSE controller manages said DC power supplied to a corresponding PD, said slave PSE controllers operating according to instructions from said master PSE controller via a communication link.

19. The PSE of claim 18, wherein said slave PSE controllers are connected to master PSE.

20. The PSE of claim 18, wherein said data link is an $I^2C$ communication link.

21. The PSE of claim 18, further comprising:
a media access controller coupled to said plurality of PHYs;
a host processor coupled to said MAC;
wherein said master PSE controller provides power management data to said host processor via a data link for status display.

22. The PSE of claim 21, wherein said communications link is an $I^2C$ communication link.

* * * * *

UNITED STATES PATENT AND TRADEMARK OFFICE
CERTIFICATE OF CORRECTION

PATENT NO. : 8,205,099 B2
APPLICATION NO. : 11/783401
DATED : June 19, 2012
INVENTOR(S) : Hussain et al.

Page 1 of 1

It is certified that error appears in the above-identified patent and that said Letters Patent is hereby corrected as shown below:

Column 9, line 5, please replace "connector claim 1," with --connector of claim 1--.
Column 9, line 25, please replace "claim 1 wherein" with --claim 1, wherein--.

Signed and Sealed this
Thirty-first Day of July, 2012

David J. Kappos
*Director of the United States Patent and Trademark Office*